(12) United States Patent
Elsner et al.

(10) Patent No.: US 9,004,417 B2
(45) Date of Patent: *Apr. 14, 2015

(54) FASTENING DEVICE

(75) Inventors: Markus Elsner, Kaiserslautern (DE);
Juergen Hofmann, Eisenberg (DE);
Vitali Leidner, Kaiserslautern (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 465 days.

This patent is subject to a terminal disclaimer.

(21) Appl. No.: 13/128,413

(22) PCT Filed: Nov. 27, 2009

(86) PCT No.: PCT/EP2009/008465
§ 371 (c)(1),
(2), (4) Date: Jun. 28, 2011

(87) PCT Pub. No.: WO2010/060634
PCT Pub. Date: Jun. 3, 2010

(65) Prior Publication Data
US 2012/0124782 A1 May 24, 2012

(30) Foreign Application Priority Data
Nov. 28, 2008 (DE) .......................... 10 2008 059 360

(51) Int. Cl.
*F16L 3/12* (2006.01)
*H02G 3/32* (2006.01)
*B60R 16/02* (2006.01)

(52) U.S. Cl.
CPC .............. *H02G 3/32* (2013.01); *B60R 16/0215* (2013.01)

(58) Field of Classification Search
USPC ......... 248/74.1, 74.2, 74.3, 73, 65; 24/16 PB, 24/16 R, 17 AP, 115 A, 115 R, 455, 339, 24/555, 114.5, 68 R, 531, 522; 403/3, 4, 403/384
See application file for complete search history.

(56) References Cited

U.S. PATENT DOCUMENTS

| | | | |
|---|---|---|---|
| 3,632,071 A | | 1/1972 | Cameron et al. |
| 6,196,751 B1 * | | 3/2001 | Khokhar .......................... 403/3 |
| 7,819,365 B2 * | | 10/2010 | Elsner .......................... 248/74.3 |
| 2008/0229550 A1 | | 9/2008 | Elsner |

FOREIGN PATENT DOCUMENTS

| | | |
|---|---|---|
| DE | 3812071 | 10/1989 |
| DE | 202006001743 | 5/2006 |
| DE | 202007000938 | 5/2007 |
| DE | 202008000510 | 4/2008 |
| JP | 2008007161 | 1/2008 |
| WO | 2007013966 | 11/2007 |

* cited by examiner

Primary Examiner — Todd M Epps
(74) Attorney, Agent, or Firm — Tarolli, Sundheim, Covell & Tummino LLP

(57) ABSTRACT

The invention relates to a fastening device (10) for at least one cable (44), having an edge clip part (12) for fitting the fastening device (10) to an edge (28) of a base part (26). A holding device (30) for at least one cable strap (40) surrounds at least one cable (44). The holding device (30) includes fastening sections (38) that constitute a mount for the cable strap (40) in three directions of cable strap orientation orthogonal to each other, so that a cable strap (40) can be fastened to the base part (26) selectively oriented in one of the three directions of cable strap orientation.

20 Claims, 4 Drawing Sheets

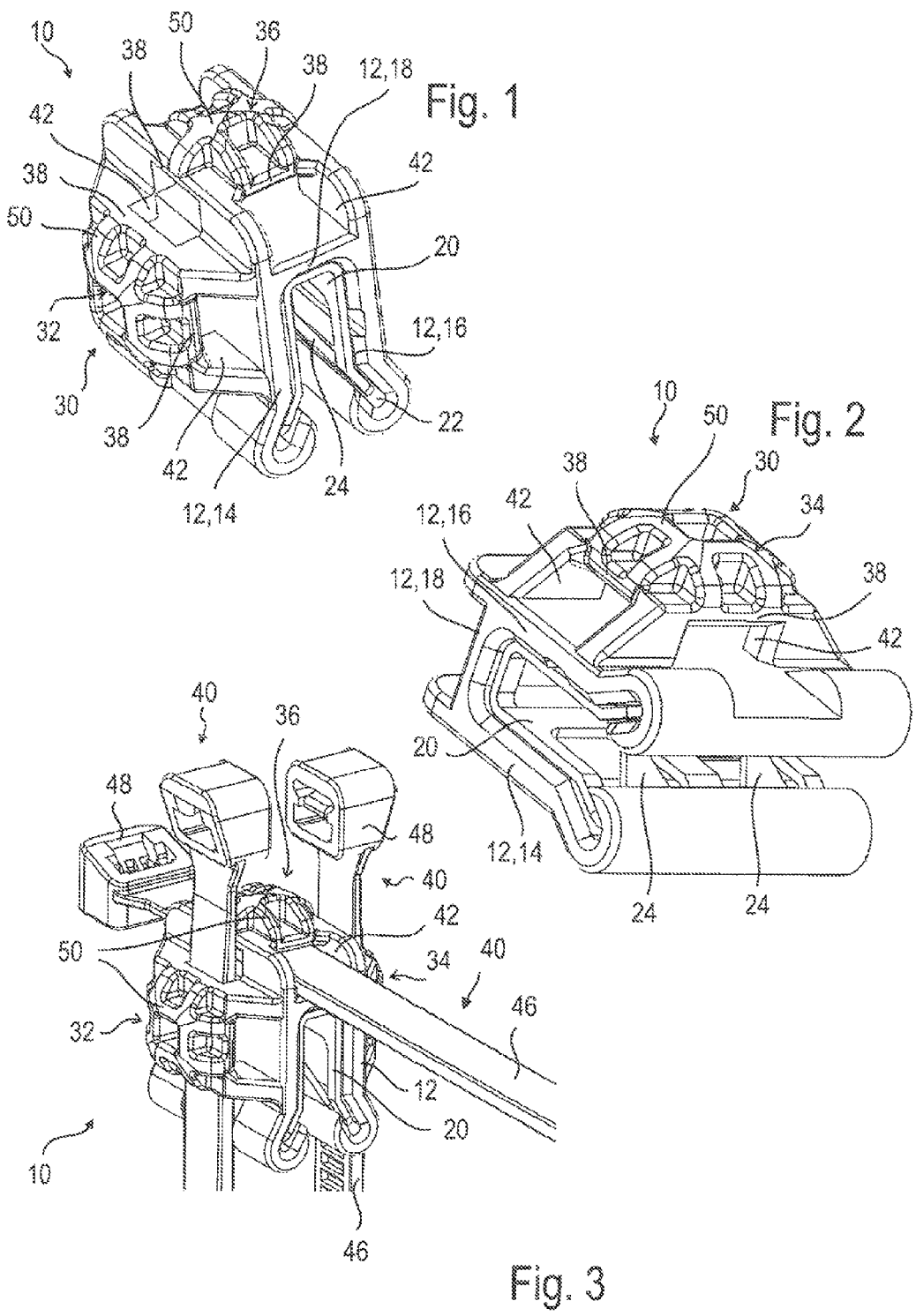

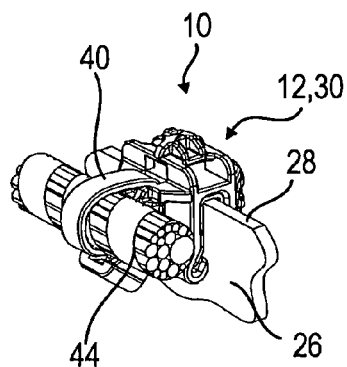
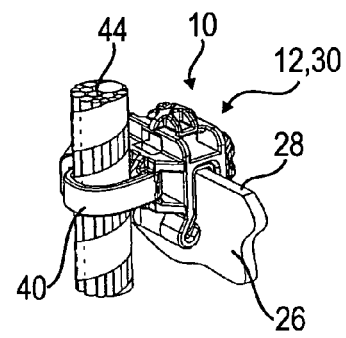
Fig. 4a    Fig. 4b
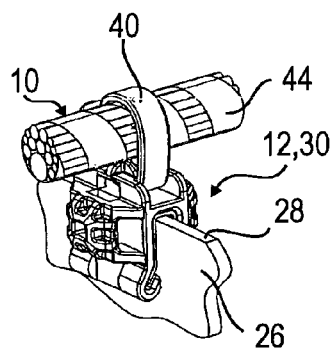
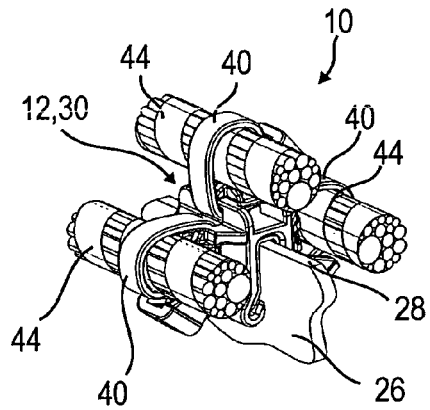
Fig. 4c    Fig. 4d
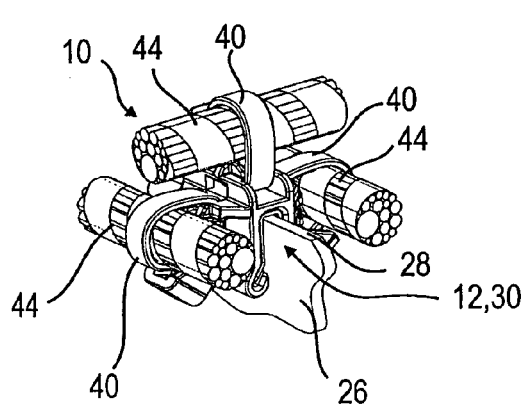
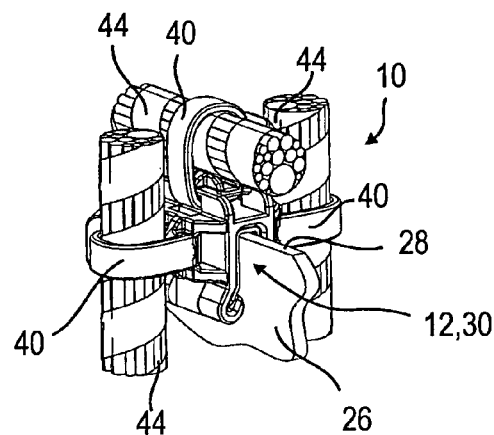
Fig. 4e    Fig. 4f

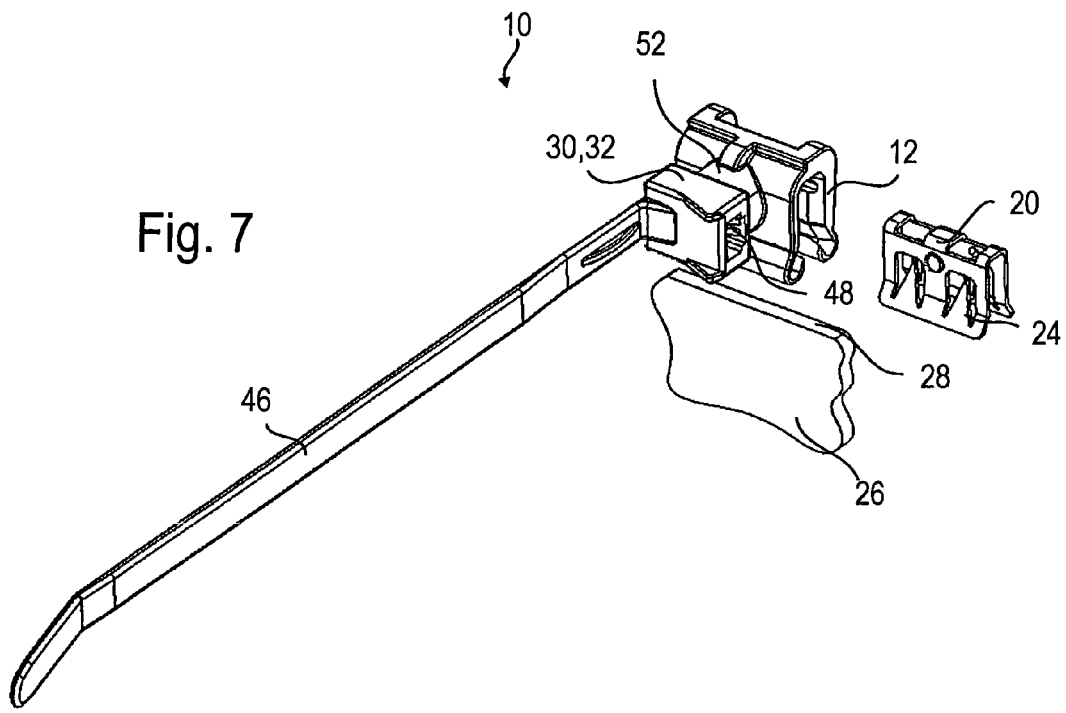
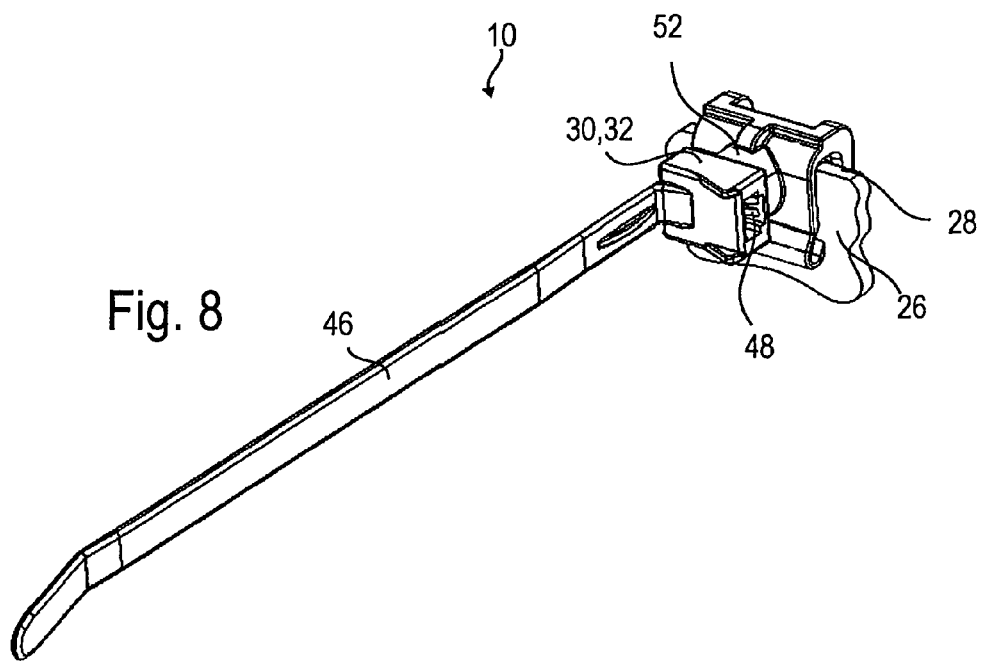

FASTENING DEVICE

SUMMARY OF THE INVENTION

The object of the present invention is to provide an even more flexibly usable fastening device for a cable.

This object is achieved by a fastening device according to claim 1. A fastening device of this type allows a cable or cable loom to be fastened in all three spatial directions relative to the edge of the base part, as a result of which only a single fastening device is necessary, irrespective of the spatial direction in which the cable is intended to be fastened to the base part. This allows costs to be saved in stock-keeping and logistics, and the fastening device is simpler to use since, irrespective of the spatial direction in which the cable is to be fastened to the base part, only one single type of fastening device is required.

The holding device may be designed for a simultaneous fastening of a plurality of cable straps to the edge clip part. The holding device has a first fastening section for holding a first cable strap on the edge clip part and a second fastening section for holding a second cable strap, the cable straps preferably being insertable into the fastening sections. In this way, it is possible for at least two cable straps to be held on the edge clip part at the same time, and therefore at least two different cables or cable looms can be fastened to one single fastening device.

Preferably, a third fastening section is provided to hold a third cable strap on the edge clip part. Thus, three cable straps may be fastened to the edge clip part at the same time.

The fastening sections may form guides for inserting a cable strap. These guides preferably determine the direction of orientation of the cable strap.

In accordance with a preferred embodiment, a first fastening section is provided on the top side of the edge clip part and a second fastening section is provided on the side of the edge clip part. This facilitates mounting the cable strap in the different directions of orientation.

Several fastening sections may be formed as one common mounting part. This allows a compact construction of the holding device by a combination of a plurality of fastening sections in one common mounting part.

For example, a mounting part includes two fastening sections for fitting a cable strap in two directions of orientation extending orthogonally to each other.

Preferably, at least one fastening section is manufactured in one piece with the edge clip part. This allows the number of individual parts of the fastening device to be reduced to a minimum.

According to a further embodiment, a mounting part having at least one fastening section is provided, the mounting part being configured as a separate component which is fastened to the edge clip part. This allows greater flexibility in designing the mounting part.

For example, the mounting part is placed on the edge clip part by a guide and is locked with the edge clip part. In this way, it is possible to attach as many mounting parts to the edge clip part as are required for a particular application.

According to a further embodiment, the mounting part is designed to be rotatable in relation to the edge clip part. This allows the angle at which the cable strap is held relative to the edge clip part to be freely selected.

A fixing means may be provided for fixing the rotatable mounting part in place in a peripheral direction. In this manner, any desired angle is possible in the peripheral direction when fastening the cable; following assembly, this angle may be reversibly or irreversibly fixed.

In accordance with a preferred embodiment, an upper mounting part having at least one fastening section is provided on the top side of the edge clip part and at least one lateral mounting part having at least one fastening section is provided on the side of the edge clip part. Preferably, each mounting part includes two fastening sections for fitting a cable strap in two directions of orientation extending orthogonally to each other. This allows, for example, one mounting part to be fitted in a plane parallel to the edge of the base part and the second mounting part to be fitted in a plane perpendicular to the edge of the base part.

A cable strap and the edge clip part and/or a mounting part may be integrally connected with each other. This results in a further reduction in the number of individual parts of the fastening device.

The holding device may be configured as a cable strap lock, as a result of which a cable strap may directly snap into place at the holding device in the cable strap lock.

Preferably, a cable strap is a separate component that includes a cable strap part and a cable strap lock. In this way, the number of cable straps and the direction of orientation of the cable strap may be freely selected.

According to a preferred embodiment, a metal piece is provided which is adapted to be inserted into the edge clip part, the metal piece having at least one sheet metal claw which, with the fastening device fitted in place, directly engages the base part. The sheet metal claw thus locks the fastening device in place on the base part.

It is possible for a plurality of cable straps to be held on the holding device and for the directions of orientation of the cable straps to provide for at least two cables extending in the same direction to be fastened to the edge clip part. This allows a guidance of separate cables or cable looms in the same direction.

As an alternative, a plurality of cable straps may be held on the holding device and the directions of orientation of the cable straps may allow at least two cables extending in different directions, in particular orthogonally to each other, to be fastened to the edge clip part.

Preferably, a fastening section is provided with an extension that is directed outwards, a cable fastened to the fastening device being adapted to be clamped between the extension and the cable strap held by the fastening section. The extension causes the fastening of the cable or cable loom to be improved, for instance by an increase in friction between the cable and the extension of the fastening section or by a shaping that allows the cable to be fixed in position.

In accordance with a preferred embodiment, the extension is shaped such, more particularly curved such that the closed and tightened cable strap, without clamping a cable in between, rests against the extension on the outside. By the extension extending, as it were, towards the loop-type cable strap, the loop may be pulled tight until a stop is reached. This allows even very thin cables having a cross-section of close to zero to be fastened.

BRIEF DESCRIPTION OF THE DRAWINGS

Further features and advantages of the invention will be apparent from the description below and from the accompanying drawings, to which reference is made and in which:

FIG. 1 shows a perspective view of the edge clip part and the holding device of a fastening device according to a first embodiment of the invention;

FIG. 2 shows a further perspective view of the edge clip part and the holding device according to FIG. 1;

FIG. 3 shows a perspective view of the fastening device according to FIG. 1, with cable straps inserted;

FIG. 4a to FIG. 4f show various perspective views of the fastening device according to FIG. 1, with different numbers of cable straps in different directions of orientation;

FIG. 7 shows an exploded view of a fastening device according to a third embodiment of the invention; and FIG. 8 shows a view of the embodiment according to FIG. 7 in the assembled condition.

DESCRIPTION OF EMBODIMENTS

Figure 5:
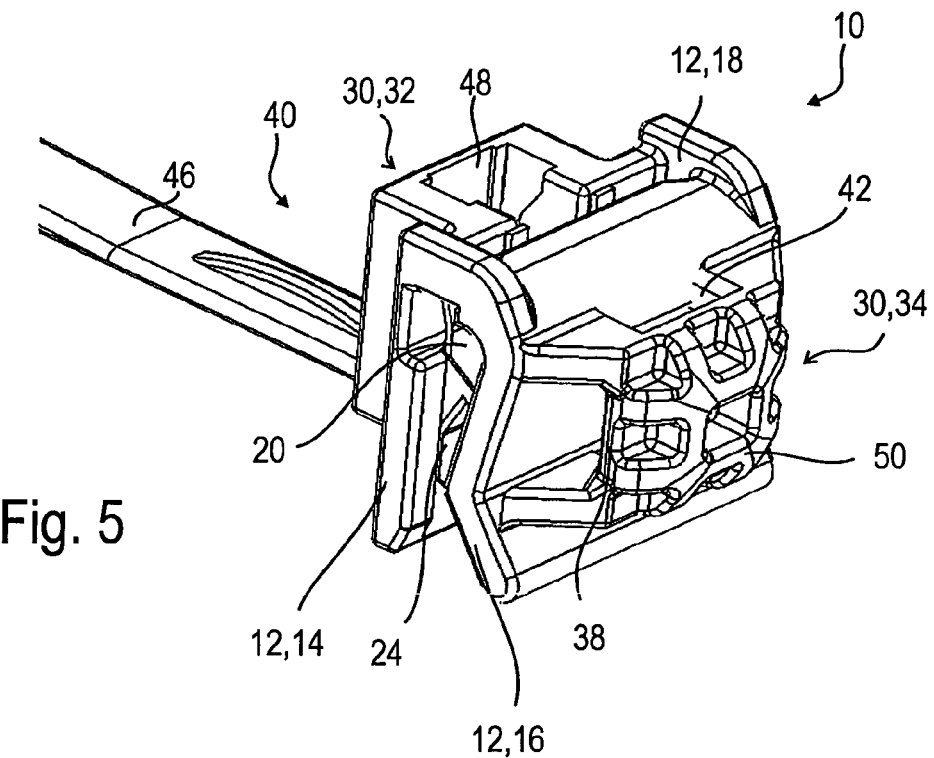
FIG. 5 shows a perspective view of a fastening device according to a second embodiment of the invention.

FIGS. 1 to 4f show a fastening device 10 according to a first embodiment of the invention. A U-shaped edge clip part 12 includes a pair of legs 14, 16 which are more particularly integrally connected to each other by means of a connecting portion 18 that constitutes the upper side of the edge clip part 12.

A U-shaped metal piece 20 is arranged between the first leg 14 and the second leg 16, the upper end of the metal piece 20 resting against the connecting portion 18 of the edge clip part 12 and the two lower ends of the metal piece 20 being locked in place in oblique recesses 22 in the legs 14, 16. The metal piece 20 includes a plurality of sheet metal claws 24 (see FIG. 2) which, with the fastening device 10 in the attached condition, directly engage a base part 26 to which the fastening device 10 and cables are intended to be fitted. The base part 26 is more particularly a sheet metal part on a vehicle, the sheet metal part being provided anyway. The legs 14, 16 of the edge clip part 12 are designed to be springy, as a result of which the edge clip part 12 can be better fastened to the edge 28 of the base part 26.

The metal piece 20 may be fitted in the edge clip part 12 in a preassembled condition or, depending on the required application, be introduced into the edge clip part 12. Depending on the application needs, the metal piece 20 will possibly have different designs in order to allow for different embodiments, in particular different thicknesses of the edges 28 of the base parts 26.

A holding device 30 is configured in one piece with the edge clip part 12. The holding device 30 comprises a first lateral mounting part 32, a second lateral mounting part 34, and an upper mounting part 36. The mounting parts 32, 34, 36 are each provided with two fastening sections 38. A cable strap 40 may be introduced into the intersecting fastening sections 38 which are of a bridge-type design. Each fastening section 38 has guides 42 formed thereon which determine the directions of orientation of the cable strap 40.

The guides 42 are preferably configured such that a rotary motion of the cable strap 40 of more than ±5 degrees within the guide 42 is prevented.

With respect to the directions of orientation of the cable straps 40, it should be appreciated that the longitudinal direction in which the cable strap 40 extends and the rotational orientation about an axis in this longitudinal direction are both relevant to the orientation of the cable strap 40.

FIG. 3 shows three cable straps 40 each inserted in a respective mounting part 32, 34, 36, without holding a cable. The direction of insertion of the cable straps corresponds to their longitudinal direction. In the embodiment shown, inserted into the mounting parts 32, 34, 36 are two cable straps 40 along their longitudinal direction perpendicularly to the edge and one cable strap 40 along its longitudinal direction parallel to the edge. In the following, the direction of the cable or cable loom 44 held by the respective cable strap 40 is defined as the direction of orientation of the cable straps 40.

When a cable strap 40 is inserted into the mounting part 32 in the direction of insertion along the edge 28 and a second cable strap 40 is inserted into the mounting part 36 in the direction of insertion along the edge 28, the two cable straps have directions of orientation that differ by 90 degrees since, due to the different orientations of the cable straps 40, the cables or cable looms 44 held by the two cable straps 40 extend in directions differing by 90 degrees (cf. FIG. 4b and FIG. 4c).

Similarly, it is also possible for cable straps 40 with different directions of insertion into the respective mounting part 32-36 to have the same direction of orientation (cf. FIG. 4d, where the direction of insertion of the upper cable strap is horizontal and that of the two lateral cable straps 40 is vertical).

As can be clearly seen in FIG. 1, the mounting parts 32, 34, 36 are separate from each other because the lateral mounting parts 32, 34 are located entirely on the outer sides of the legs 14, 16, and the upper mounting part 36 is located entirely on the top side of the connecting portion 18 of the edge clip part 12.

Each fastening section 38 has on its exterior one or more extensions 50 that are arched outwards. When the cable straps 40 shown in FIG. 3 are closed by inserting the cable strap parts 46 into the cable strap locks 48 and tightening them, a space will form between the cable strap 40 and the fastening section holding the respective cable strap 40. As the cable strap 40 is tightened further, this space will become smaller until, owing to the stiffness of the cable strap, the process of closing the cable strap 40 can no longer be continued. Here, the shape of the extensions 50 is selected such that the cable strap 40 rests directly against the extension 50. In this way, even very thin cables 44 that have a diameter close to zero may also be held by the fastening device. It is, of course, also possible for extensions 50 of different shapes to be fitted to the fastening sections 38, for example in order to increase the friction between the cable 44 and the fastening section 38 or to avoid any damage to the cables 44 as caused by kinking.

Each mounting part 32, 34, 36 includes two fastening sections 38 for fitting a cable strap 40 in two directions of orientation extending orthogonally to each other. The combination of the three mounting parts 32, 34, 36 thus allows cable straps 40 to be held on the edge clip part 12 in three directions of orientation orthogonal to each other.

FIGS. 4a to 4c show three examples of application of the fastening device 10, the cable straps 40 being held in a respective one of the three directions of orientation orthogonal to each other, the cable straps 40 each holding a cable or cable loom 44.

The cable straps 40 are separate components and include a cable strap part 46 and a cable strap lock 48 (see FIG. 3). It is therefore possible to select a suitable cable strap 40, depending on the application requirements, for example in terms of the length or the cable strap locking mechanism.

FIGS. 4d, 4e and 4f show further examples of application of the fastening device 10, with a plurality of cables or cable looms 44 being fastened to an edge clip part 12 by a plurality of cable straps 40. Here it is possible for a plurality of cables or cable looms 44 to run in the same direction and to be fastened to the edge clip part 12 independently of each other (cf. FIG. 4d). Also, a plurality of cables or cable looms 44 may be attached to the edge clip part 12 in different directions (cf. FIG. 4e, 4f).

In addition to fastening only cable looms or individual cables to the edge 28 of the base part 26 by means of the fastening device 10, it is, of course, also possible to use the fastening device 10 to fasten tubes, pipes or hoses, for example.

It is also conceivable that one or more mounting parts 32, 34, 36 are formed as separate components that are fastened to the edge clip part 12 by being placed on the edge clip part 12 by a guide and locked in place on the edge clip part.

Furthermore, a separate mounting part may be made rotatable in relation to the edge clip part 12, or the cable strap may be rotatable within the fastening section. After assembly of the fastening device 10, the rotatable mounting part or the rotatable cable strap can be fixed in place in a peripheral direction by a fixing means. In doing so, the mounting part or the cable strap may be reversibly or irreversibly fixed in place, such as by a mechanical locking arrangement and/or by activation of an adhesive that is microencapsulated, for example.

FIG. 5 shows a second embodiment of the invention. Provided on the first leg 14 of the edge clip part 12 is a first lateral mounting part 32 which is in the form of a cable strap lock 48. The mounting part 32 is formed in one piece with the edge clip part 12 and a cable strap 40 having a cable strap part 46. Analogous to the first embodiment of the invention, a second lateral mounting part 34 is provided on the second leg 16 of the edge clip part 12. A metal piece 20 having sheet metal claws 24 is disposed in the space between the first and second legs 14, 16. The cable strap 40 formed in one piece with the mounting part 32 extends along a first direction of orientation, perpendicularly to the first leg 14 of the edge clip part 12. A second separate cable strap 40 may be inserted and held in the second lateral mounting part 34 in two mutually orthogonal directions.

Figure 6:
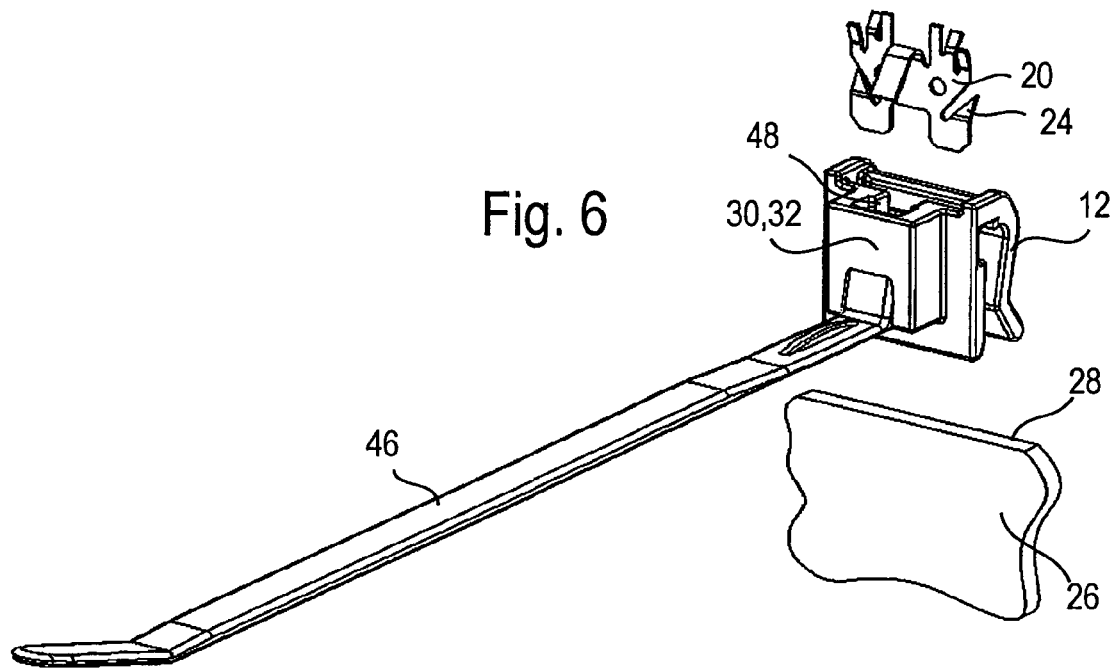
FIG. 6 shows an exploded view of the fastening device according to FIG. 5.

FIG. 6 shows an exploded view of the second embodiment of the invention. In this embodiment, the metal piece 20 is introduced from the top into the space between the first and second legs 14, 16. Of course, provision may also be made for a metal piece 20 which, by analogy with the first embodiment, is introduced into the edge clip part 12 from below or laterally.

In the embodiment according to FIG. 5, the mounting part 36 of the first embodiment, provided on the top side of the U-shaped fastening device, has been omitted for a simplified representation, but it is existent. It is possible that one or more mounting parts 32, 34, 36 of the first embodiment, by analogy with the first mounting part 32 of the second embodiment, are formed in one piece with a cable strap 40; in the case of several cable straps 40 formed in one piece with the mounting part 32, 34, 36, the directions of orientation of the cable straps 40 are orthogonal to one another.

FIG. 7 and FIG. 8 show a third embodiment of the invention, in which a separate mounting part 32 having an integrated cable strap 40 and cable strap lock 48 is designed to be rotatable in relation to the edge clip part 12. A rotary coupling 52 having a cylindrical shape is formed on the leg 14 of the edge clip part 12. The mounting part 32 is provided with a pin that is mounted for rotation in the rotary coupling 52. As a result, the mounting part 32 and the direction of orientation of the cable strap 40 are freely rotatable through 360 degrees. It is, of course, also possible for a second lateral mounting part 34 and/or an upper mounting part 36 to be provided and designed to be rotatable.

The rotary coupling 52 may also have a latching device provided therein which causes the mounting part 32 to be latched at specific angular distances, or a fixing means for fixing the rotatable mounting part 32 in place in a peripheral direction.

In this embodiment, too, the mounting part 36 of the first embodiment, provided on the top side of the U-shaped fastening device, has been omitted for a simplified representation, it does however exist.

By analogy with the separate mounting part 32 of the third embodiment, it is possible for one or more mounting parts 32, 34, 36 of the first embodiment to be designed for rotation in relation to the edge clip part 12; where several rotatable mounting parts are provided, the cable straps 40 fastened thereto can be rotated in orthogonal directions of orientation.

The invention claimed is:

1. A fastening device (10) for at least one cable (44), comprising an edge clip part (12) for fitting the fastening device (10) to an edge (28) of a base part (26), and further comprising a holding device (30) for at least one cable strap (40) which surrounds at least one cable (44), the holding device (30) having at least first, second and third fastening sections (38), wherein the first, second and third fastening sections (38) constitute a mount for the cable strap (40), the first, second and third fastening sections extending in three directions of cable strap orientation orthogonal to each other, so that the cable strap (40) can be fastened to the base part (26) selectively oriented in one of the three directions of cable strap orientation.

2. The fastening device (10) according to claim 1, wherein the holding device (30) is designed for a simultaneous fastening of a plurality of cable straps (40) to the edge clip part (12), the first fastening section (38) holds a first cable strap (40) on the edge clip part (12) and the second fastening section (38) holds a second cable strap (40), the cable straps (40) preferably being insertable into the fastening sections (38).

3. The fastening device according to claim 2, wherein the third fastening section (38) is provided to hold a third cable strap (40) on the edge clip part (12).

4. The fastening device according to claim 1, wherein each of the first, second and third fastening sections (38) includes guides (42) for inserting a cable strap (40).

5. The fastening device according to claim 1, wherein the first fastening section (38) is provided on the top side of the edge clip part (12) and the second fastening section (38) is provided on the side of the edge clip part (12).

6. The fastening device according to claim 1, wherein the first and second fastening sections (38) are formed as one common mounting part (32, 34, 36).

7. The fastening device according to claim 6, wherein the mounting part (32, 34, 36) includes the first and second fastening sections (38) for fitting a cable strap (40) in two directions of orientation extending orthogonally to each other.

8. The fastening device according to claim 1, wherein at least one of the fastening sections (38) is manufactured in one piece with the edge clip part (12).

9. The fastening device according to claim 1, wherein a mounting part (32, 34, 36) having at least one of the first, second and third fastening sections (38) is provided, the mounting part (32, 34, 36) being configured as a separate component which is fastened to the edge clip part (12).

10. The fastening device according to claim 9, wherein the mounting part (32, 34, 36) is placed on the edge clip part (12) by a guide and locked with the edge clip part.

11. The fastening device according to claim 9, wherein the mounting part (32, 34, 36) is designed to be rotatable in relation to the edge clip part (12).

12. The fastening device according to claim 11, wherein a fixing means is provided for fixing the rotatable mounting part (32, 34, 36) in place in a peripheral direction.

13. The fastening device according to claim 1, wherein at least two of a cable strap (40), the edge clip part (12), and a mounting part (32, 34, 36) are integrally connected with each other.

14. The fastening device according to claim 1, wherein the holding device (30) is configured as a cable strap lock (48).

15. The fastening device according to claim 1, wherein a cable strap (40) is a separate component that includes a cable strap part (46) and a cable strap lock (48).

16. The fastening device according to claim 1, wherein a metal piece (20) is provided which is insertable into the edge clip part (12), the metal piece (20) having at least one sheet metal claw (24) which, with the fastening device (10) placed on, directly engages the base part (26).

17. The fastening device according to claim 1, wherein a plurality of cable straps (40) is held on the holding device (30) and the directions of orientation of the cable straps (40) allow at least two cables (44) extending in the same direction to be fastened to the edge clip part (12).

18. The fastening device according to claim 1, wherein a plurality of cable straps (40) is held on the holding device (30) and the directions of orientation of the cable straps (40) provide for at least two cables (44) extending in different directions, in particular orthogonally to each other, to be fastened to the edge clip part (12).

19. The fastening device according to claim 1, wherein one of the first and second fastening sections (38) is provided with an extension (50) that is directed outwards, a cable (44) fastened to the fastening device (10) being adapted to be clamped between the extension (50) and the cable strap (40) held by the one of the first and second fastening sections (38).

20. The fastening device according to claim 19, wherein the extension (50) is shaped such, more particularly curved such that the closed and tightened cable strap (40), without a cable clamped in between being provided, rests against the extension (50) on the outside.

* * * * *